No. 767,448. PATENTED AUG. 16, 1904.
A. SMITH.
MACHINE FOR FORMING CLOTHES PIN BLANKS.
APPLICATION FILED NOV. 18, 1903.
NO MODEL.
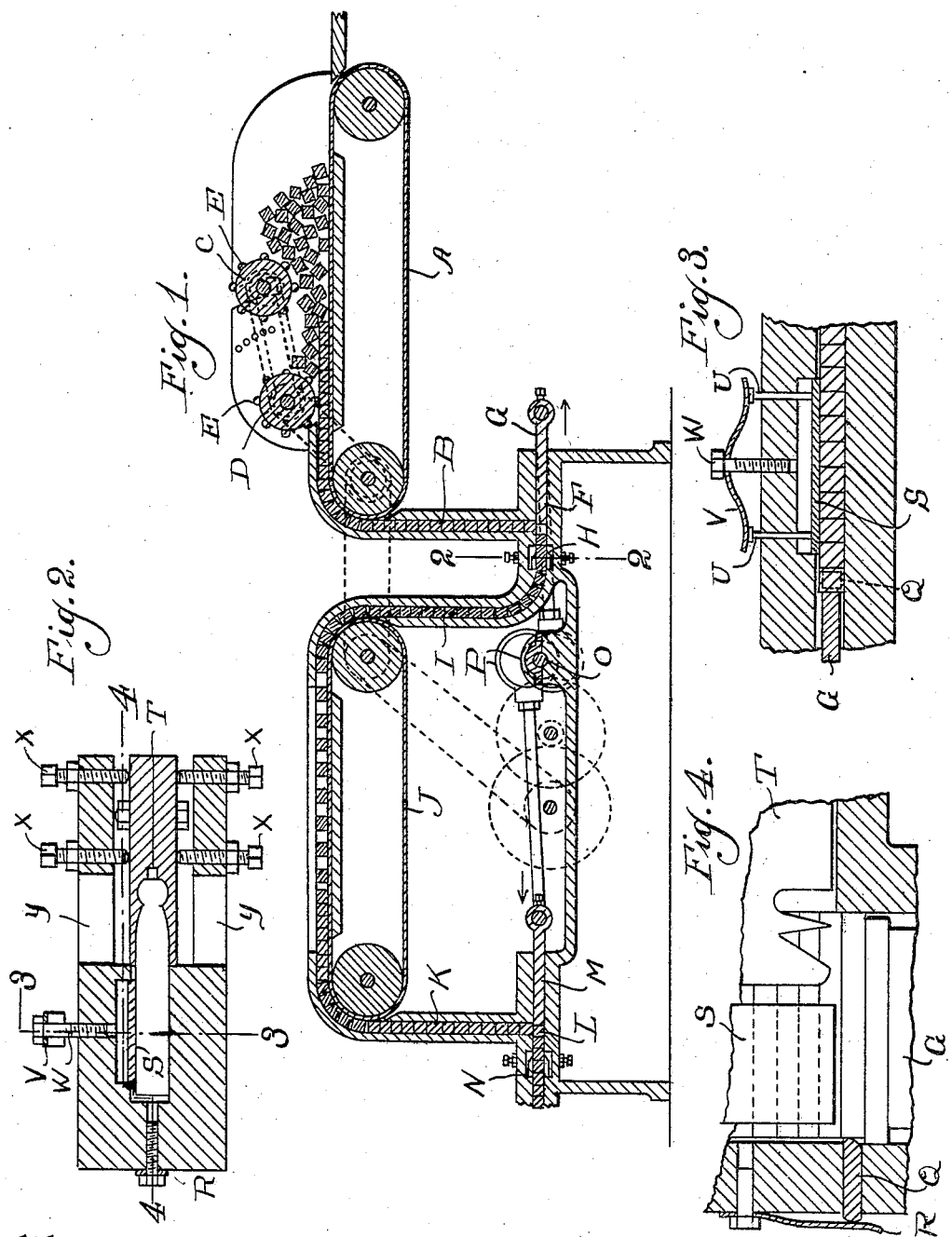
Witnesses:
E. F. Wilson
F. Schlotfeld
Inventor:
Andrew Smith
By Rudolph Wm. Lotz
Attorney No. 767,448. Patented August 16, 1904.

UNITED STATES PATENT OFFICE.

ANDREW SMITH, OF TRAVERSE CITY, MICHIGAN.

MACHINE FOR FORMING CLOTHES-PIN BLANKS.

SPECIFICATION forming part of Letters Patent No. 767,448, dated August 16, 1904.

Application filed November 18, 1903. Serial No. 181,675. (No model.)

*To all whom it may concern:*

Be it known that I, ANDREW SMITH, a citizen of the United States, residing at Traverse City, in the county of Grand Traverse and State of Michigan, have invented certain new and useful Improvements in Machines for Forming Clothes-Pin Blanks; and I do hereby declare the following to be a full, clear, and exact description of the invention, such as will enable others skilled in the art to which it appertains to make and use the same.

This invention relates to a novel construction in a machine for forming clothes-pin blanks, the object being to provide a simple efficient machine for this purpose operating at very high speed; and it consists in the features of construction and combinations of parts hereinafter fully described and claimed.

In the accompanying drawings, illustrating my invention, Figure 1 is a vertical longitudinal section of a machine constructed in accordance with my invention. Fig. 2 is a detail transverse section of same, on an enlarged scale, on the line 2 2 of Fig. 1. Fig. 3 is a detail section on the line 3 3 of Fig. 2. Fig. 4 is a detail section on the line 4 4 of Fig. 2.

My invention relates to that class of machines in which blocks of requisite size are fed consecutively and forced between knives which serve to shape such blocks to form the clothes-pin or other blanks or devices, as desired.

The main object of the present invention is to provide a simple compact machine which is easily fed and operates with great rapidity and efficiency, and to this and other ends I provide at one end of the machine a feed-belt A, trained over pulleys suitably journaled in the frame of the machine and which serves to feed the blocks into a vertical chute B.

In order to prevent said blocks from being fed irregularly, I provide two rotating drums C and D above said belt, beneath which said blocks must pass into said chute B. The said drums are provided with longitudinal ribs E and are revolved slowly, so as to force the blocks in a direction opposite to that in which they are carried by the belt, the drum C being so located as to retard the main body of blocks, but allowing sufficient space underneath for the passage of several layers and the drum D being so located as to prevent the passage of more than one layer of said blocks. Said drums also serve to prevent the blocks from passing into the chute B at an angle.

Said chute B opens into a horizontal chute F at its lower end and feeds the blocks consecutively into the path of a reciprocating plunger G, entering said chute F at one end and serving to force said blocks consecutively through the shaping devices H, interposed in said chute F and which will be hereinafter more fully described.

The speed of said belt A is so regulated relatively to the speed of the plunger G as to feed the blocks faster than said plunger can force same through said chute F, so that said belt slips relatively to said blocks and by its friction serves to force same down said chute B. This action also has the effect of serving to hold said blocks parallel and in contact with each other. After passing between said shaping devices H said blocks pass into a chute I, which is curved upwardly and feeds said blocks upon a belt J, which carries them into a second vertical chute K, said belt J being also arranged to travel faster than said plunger G drives said blocks. The said chute K delivers said blocks into a second horizontal chute L and into the path of a reciprocating plunger M therein, which forces said blocks consecutively between a second set of shaping-knives N, interposed in said chute L. Said blocks being rectangular, are shaped on two sides in said chute F and on the other two sides in said chute L, from which they are delivered.

By means of side plates or guards on each side of the belts A and J and the side walls of the chutes said blocks are held against endwise movement.

The said plungers G and M receive their motion from a drive-shaft O, journaled in the frame of the machine between the two sets of shapers and are connected with eccentrics P on said shaft by means of pitmen in a well-known manner. Said belts A and J are geared to said shaft O in any suitable manner.

The blocks are cut to requisite lengths and diameter before being fed to the machine, the latter serving to cut away the four long sides at one end to form the head and neck, as shown in Fig. 2. In order to accomplish this, the said blocks, which fit loosely in said chutes, must be firmly held and fed to the shaping-knives uniformly. To this end I provide a plunger Q, passing through one of the side walls of each of the chutes F and L, said plungers being rounded at their inner ends and held by springs R in the path of one end of the blocks and serving to force same endwise as they pass into contact with the opposite wall of the chute. After passing said plunger Q in either chute said blocks pass under a plate S, located opposite the ends of the shaping-knives T, entering the chute at one side and adapted to cut away the end portions of said blocks. Said plate S is pressed down upon said blocks by means of spring-actuated pins U, passing through the upper wall of the chute, said pins being engaged by the ends of a flat spring V, through the middle of which a set-screw W passes which enters a threaded opening in the top wall of the chute. The said plate S by its pressure on the other end portions of the blocks serves to practically equalize the resistance to the passage thereof exerted by said shaping-knives T, so that said blocks are thus prevented from turning endwise. The said knives are held in position by means of set-screws X, bearing thereon, the cutting edges of said knives being located opposite openings Y in the upper and lower walls of the chute, through which the shavings are discharged.

I claim as my invention—

1. In a machine of the kind specified, the combination with two sets of forming-knives each mounted in a horizontal chute and simultaneously consecutively operated plungers adapted to force blanks through said forming-knives to form opposite sides of said blanks in each of said knives, of means for feeding blanks into the path of the first of said plungers and means for transporting the blanks from said first horizontal chute and feeding same into the path of said second plunger including means for turning said blanks through on arc of ninety degrees, whereby said second forming-knives will form the sides of said blanks which said first set of forming-knives did not form.

2. In a machine of the kind specified, the combination with a horizontal chute, forming-knives interposed therein, and a reciprocating plunger movable in said chute, of a vertical chute entering said horizontal chute between the limits of movement of said plunger and adapted to feed blocks in the path of the latter to be carried thereby consecutively to said forming-knives, a second horizontal chute, forming-knives interposed therein and a reciprocating plunger movable in said second horizontal chute, a vertical chute entering said second horizontal chute between the limits of movement of said plunger moving therein and adapted to feed blocks in the path of the latter to be carried thereby consecutively to said forming-knives mounted therein and means for receiving said blocks after passing said first forming-knives and turning them through an arc of ninety degrees and delivering the same to said last-mentioned vertical chute.

3. In a machine of the kind specified, the combination with a horizontal chute, forming-knives interposed therein and a reciprocating plunger movable in said chute, of a vertical chute entering said horizontal chute between the limits of movement of said plunger and adapted to feed blocks in the path of the latter to be carried thereby consecutively to said forming-knives, spring-actuated devices interposed in the path of said blocks adjacent said forming-knives for automatically adjusting the position thereof relatively to said knives, an ogee-curved chute receiving said blocks after passing said forming-knives and carrying them upward and delivering same upon a carrier, a second vertical chute receiving said blocks from said carrier and delivering same into a second horizontal chute, a second pair of forming-knives in said second horizontal chute, and a reciprocating plunger in said chute in the path of which said blocks are fed by said vertical chute to be forced through said second pair of forming-knives, substantially as described.

4. In a machine of the kind specified, the combination with a chute adapted to receive blocks to be formed, and forming devices interposed in said chute in the path of said blocks, of means for forcing said blocks past said forming devices, a yielding plunger entering said chute at one side and projecting into the path of said blocks at one end for forcing same into contact with the opposite wall of the chute at their other ends, and a yielding presser-plate interposed in said chute in alinement with said forming devices and bearing upon the upper faces of said blocks to equalize the resistance of said forming devices to their passage.

5. In a machine of the kind specified, the combination with two sets of forming devices, and means for forcing blocks therethrough, of carrying means for transporting said blocks from one of said sets of forming devices to the other thereof, said means including two chutes and a carrier interposed between the same receiving said blocks from one chute and delivering same to the other thereof, said carrier being regulated to travel faster than said blocks to prevent jamming thereof, substantially as described.

In testimony whereof I affix my signature in presence of two witnesses.

ANDREW SMITH.

Witnesses:
RUDOLPH WM. LOTZ,
E. F. WILSON.